United States Patent
Robinson et al.

(10) Patent No.: US 8,345,864 B1
(45) Date of Patent: Jan. 1, 2013

(54) ELLIPTIC CURVE CRYPTOGRAPHY SCALAR MULTIPLICATION WITH ON DEMAND ACCELERATION TABLE GENERATION

(75) Inventors: Peter Alan Robinson, Enoggera Reservoir (AU); David Paul Makepeace, Middle Park (AU); Jaimee Brown, South Brisbane (AU)

(73) Assignee: EMC Corporation, Hopkinton, MA (US)

( * ) Notice: Subject to any disclaimer, the term of this patent is extended or adjusted under 35 U.S.C. 154(b) by 641 days.

(21) Appl. No.: 12/569,284

(22) Filed: Sep. 29, 2009

Related U.S. Application Data

(60) Provisional application No. 61/122,131, filed on Dec. 12, 2008, provisional application No. 61/122,125, filed on Dec. 12, 2008, provisional application No. 61/122,116, filed on Dec. 12, 2008, provisional application No. 61/122,120, filed on Dec. 12, 2008.

(51) Int. Cl.
*H04L 9/00* (2006.01)

(52) U.S. Cl. ............ 380/30; 380/28; 713/174; 713/172; 713/168; 713/150

(58) Field of Classification Search .................. None
See application file for complete search history.

(56) References Cited

U.S. PATENT DOCUMENTS

| | | | | |
|---|---|---|---|---|
| 7,110,538 | B2 * | 9/2006 | Gallant et al. ................. | 380/28 |
| 7,991,154 | B2 * | 8/2011 | Longa et al. .................... | 380/30 |
| 2007/0064932 | A1 * | 3/2007 | Struik et al. .................... | 380/30 |

OTHER PUBLICATIONS

Robinson et al., "Size Optimization for Large Elliptic Curve Cryptography Scalar Multiplication Acceleration Tables," U.S. Appl. No. 12/633,400, filed Dec. 8, 2009.
Makepeace et al., "Using Multiples Above Two with Running totals in Elliptic Curve Cryptography Scalar Multiplication Acceleration Tables," U.S. Appl. No. 12/633,395, filed Dec. 8, 2009.
Parkinson et al., "Using Multiples Above Two with Running Totals and Reference Values Other Than 0 and 2 (Window Size) in Elliptic Curve Cryptogrpahy Scalar Multiplication," U.S. Appl. No. 12/569,280, filed Sep. 29, 2009.
Robinson et al., "Optimizing Algorithm for Large Elliptic Curve Cryptography Scalar Multiplication Acceleration Tables," U.S. Appl. No. 61/122,116, filed Dec. 12, 2008.
Makepeace et al., "Using Multiples Above Two with Running totals in Elliptic Curve Cryptography Scalar Multiplication Acceleration Tables," U.S. Appl. No. 61/122,120, filed Dec. 12, 2008.
Parkinson et al., "Using Reference Values Other Than 0 and 2 (Window Size) in Elliptic Curve Cryptography Scalar Multiplication Acceleration Tables," U.S. Appl. No. 61/122,125, filed Dec. 12, 2008.

(Continued)

*Primary Examiner* — Pramila Parthasarathy
(74) *Attorney, Agent, or Firm* — BainwoodHuang

(57) ABSTRACT

An improved technique involves dynamic generation of at least a portion of an acceleration table for use in elliptic curve cryptography. Such dynamic generation is capable of providing savings with regard to carrying out elliptic curve cryptography without an acceleration table. Furthermore, once the portion of the acceleration table is dynamically generated and stored (e.g., in a high speed cache), the portion of the acceleration table is capable of being used on subsequent elliptic curve cryptography operations as well thus enabling the cost of dynamically generating the acceleration table to be amortized across multiple elliptic curve cryptography operations.

18 Claims, 3 Drawing Sheets

OTHER PUBLICATIONS

Robinson et al., "Fast to Generate Elliptic Curve Cryptography Scalar Multiplication Acceleration Tables," U.S. Appl. No. 61/122,131, filed Dec. 12, 2008.

U.S. Department of Commerce/National Institute of Standards and Technology, "Digital Signature Standard (DSS)," Federal Information Processing Standards Publication, FIPS PUB 186-2, Jan. 27, 2000, 72 pages.

López et al., "An Overview of Elliptic Curve Cryptography," Relatório Técnico IC-00-10, May 2000, pp. 1-34.

* cited by examiner

ELLIPTIC CURVE CRYPTOGRAPHY SCALAR MULTIPLICATION WITH ON DEMAND ACCELERATION TABLE GENERATION

CROSS REFERENCE TO RELATED APPLICATIONS

This Patent Application claims the benefit under 35 U.S.C. §119(e) of U.S. Provisional Patent Application No. 61/122,131 filed on Dec. 12, 2008, entitled, "FAST TO GENERATE ELLIPTIC CURVE CRYPTOGRAPHY SCALAR MULTIPLICATION ACCELERATION TABLES", the contents and teachings of which are hereby incorporated by reference in their entirety. This Patent Application claims the benefit under 35 U.S.C. §119(e) of U.S. Provisional Patent Application No. 61/122,125 filed on Dec. 12, 2008, entitled, "USING REFERENCE VALUES OTHER THAN 0 AND 2^(WINDOW SIZE) IN ELLIPTIC CURVE CRYPTOGRAPHY SCALAR MULTIPLICATION ACCELERATION TABLES," the contents and teachings of which are hereby incorporated by reference in their entirety. This Patent Application claims the benefit under 35 U.S.C. §119(e) of U.S. Provisional Patent Application No. 61/122,116 filed on Dec. 12, 2008, entitled, "OPTIMIZING ALGORITHM FOR LARGE ELLIPTIC CURVE CRYPTOGRAPHY SCALAR MULTIPLICATION ACCELERATION TABLES," the contents and teachings of which are hereby incorporated by reference in their entirety. This Patent Application claims the benefit under 35 U.S.C. §119(e) of U.S. Provisional Patent Application No. 61/122,120 filed on Dec. 12, 2008, entitled, "USING MULTIPLES ABOVE TWO WITH RUNNING TOTALS IN ELLIPTIC CURVE CRYPTOGRAPHY SCALAR MULTIPLICATION ACCELERATION TABLES," the contents and teachings of which are hereby incorporated by reference in their entirety. This Patent Application is related to the U.S. patent application entitled "USING MULTIPLES ABOVE TWO WITH RUNNING TOTALS AND REFERENCE VALUES OTHER THAN 0 AND 2^(WINDOW SIZE) IN ELLIPTIC CURVE CRYPTOGRAPHY SCALAR MULTIPLICATION ACCELERATION TABLES," filed on even date herewith by Sean Parkinson, Mark Hibberd, Peter Alan Robinson, and David Paul Makepeace.

BACKGROUND

Public key cryptography is a technique for protecting communications. Using this technique, electronic devices wishing to transmit information amongst themselves are each associated with a public key and a private key. Each electronic device's private key is kept by that electronic device as a secret from all other electronic devices. Each electronic device's public key may be widely distributed amongst other electronic devices. Each corresponding public key and private key are related mathematically, but the private key cannot be practically derived from the public key. In use, for example, a first electronic device wishing to send a cryptographically processed message to a second electronic device first encrypts the message with the second electronic device's public key. The first electronic device then forwards the cryptographically processed message to the second electronic device. Upon receiving the cryptographically processed message, the second electronic device decrypts the message with the second electronic device's private key.

One conventional way of creating and using public and private keys is through the use of Elliptic Curve Cryptography (ECC). ECC incorporates a group of points on an elliptic curve defined over a finite field in the production of public and private keys. ECC is useful for defining the relationship between public and private keys because there is no sub-exponential algorithm known to solve a discrete logarithm problem on a properly chosen elliptic curve. The lack of such a known algorithm ensures that a private key cannot be practically derived from its corresponding public key. The performance of ECC depends on the speed of finite field operations and scalar multiplication, and the choice of curve and finite field. While there is a standard type of elliptic curve equation, there are many different elliptic curves. They are distinguished by the values of their coefficients and the finite field over which they are defined.

Curves in common use are standardized by organizations such as the National Institute of Standards and Technology (NIST) and the American National Standards Institute (ANSI). These standardized curves are given names and are referred to as named curves. Despite being called named curves, they actually define an elliptic curve group. An elliptic curve group is defined by an operation that can be applied to points on an elliptic curve, referred to as point addition, together with a set of points on the curve. This set of points is defined such that, given a point on the elliptic curve (i.e., a base point, or a generator point), all points in the set can be obtained by successive application of the point addition operation to the base point. The elliptic curve group includes the point at infinity which is the additive identity of the group. The number of points in the elliptic curve group is called the order. An example named curve is P256, which is defined in NIST's Digital Signature Standard issued on Jan. 27, 2000 as FIPS 186-2, the contents and teachings of which are hereby incorporated by reference in their entirety. Other examples of named curves include B283, K283, B409, K409, P384, B571, K571, and P521.

ECC scalar multiplication is the multiplication of a point on the elliptic curve by a scalar. While ECC scalar multiplication can be described in terms of successively applying point addition, there are techniques available that allow a scalar multiplication to be performed more quickly. ECC scalar multiplication can be accelerated by pre-generating multiples of the point to be multiplied. This set of pre-generated values is called an acceleration table. Acceleration tables are made up of sub-tables, each sub-table being used to calculate a partial result for a sub-set window size bits in length of the scalar.

SUMMARY

Unfortunately there are deficiencies to the above-described conventional approach to ECC scalar multiplication. For example, if a desired acceleration table has not been pre-generated, then ECC scalar multiplication is performed in an unaccelerated manner. However, unaccelerated ECC scalar multiplication is significantly slower than accelerated ECC scalar multiplication that utilizes a pre-generated acceleration table.

An improved technique involves dynamic generation of at least a portion of an acceleration table for use in elliptic curve cryptography. Such dynamic generation is capable of providing savings with regard to carrying out elliptic curve cryptography without an acceleration table. Furthermore, once the portion of the acceleration table is dynamically generated and stored (e.g., in a high speed cache), the portion of the acceleration table is capable of being used on subsequent elliptic curve cryptography operations as well thus enabling the cost of dynamically generating the acceleration table to be amortized across multiple elliptic curve cryptography operations.

One embodiment is directed to a method for generating a cryptographically modified value. This value could have been modified for encryption, for digital signing, or for digital key agreement. The method includes receiving, in cryptographic processing circuitry from a user interface, a input value to be cryptographically processed and applying, in the cryptographic processing circuitry, ECC based cryptographic processing to the value to generate a cryptographically processed value. Applying ECC-based cryptographic processing includes generating an enhanced acceleration table (EAT) in response to receiving, in the cryptographic processing circuitry from the user interface, the EAT including a plurality of ordered sub-tables, each sub-table including exactly one entry. Applying ECC-based cryptographic processing also includes performing ECC scalar multiplication with the generated EAT, wherein performing ECC scalar multiplication with the EAT includes (i) calculating an ECC scalar multiplication result by generating a plurality of running totals, each running total being associated with a positive integer multiplier and (ii) calculating the sum of each running total multiplied by its associated positive integer multiplier, the sum being the ECC scalar multiplication result. Generating the plurality of running totals includes, for each sub-table of the plurality of ordered sub-tables, (i) adding a value associated with the one entry in that sub-table to a running total associated with a multiplier of the plurality of multipliers, the value being one of the one entry in that sub-table and a negation of the one entry in that sub-table and (ii) carrying a value of 1 to a next sub-table if the value is the negation of the one entry in the current sub-table. Applying ECC-based cryptographic processing additionally includes applying an ECC cryptographic processing algorithm using the calculated ECC scalar multiplication result. The method also includes outputting, from the cryptographic processing circuitry, the generated cryptographically processed value via the user interface.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves dynamic generation of at least a portion of an acceleration table for use in elliptic curve cryptography (ECC). Such dynamic generation is capable of providing savings with regard to carrying out elliptic curve cryptography without a pre-generated acceleration table. Furthermore, once the portion of the acceleration table is dynamically generated and stored (e.g., in a high speed cache), the portion of the acceleration table is capable of being used on subsequent ECC operations as well thus enabling the cost of dynamically generating the acceleration table to be amortized across multiple ECC operations.

Figure 1:
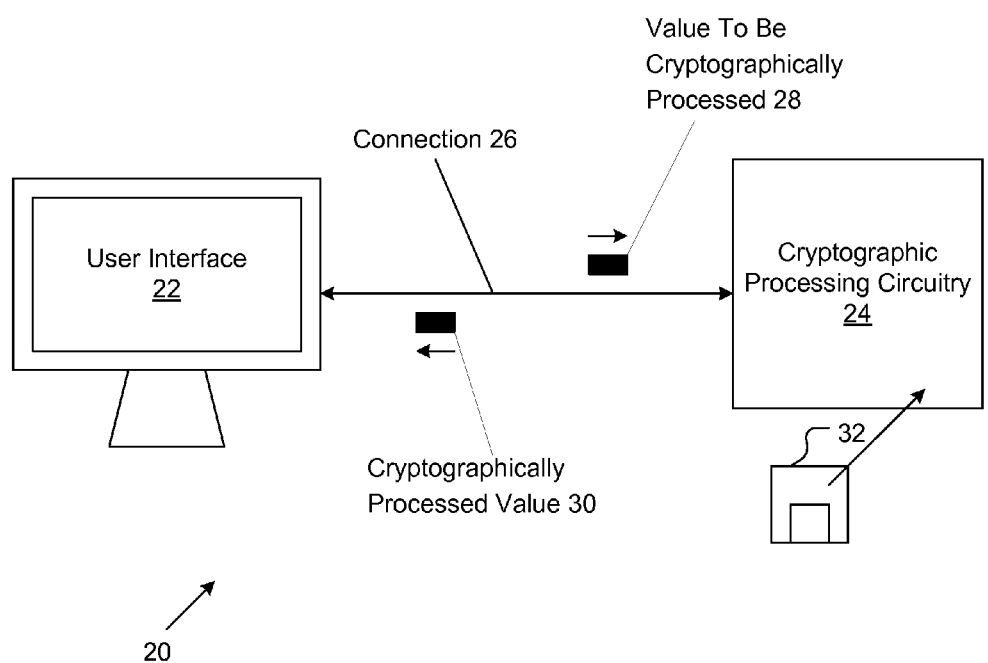
FIG. 1 illustrates a schematic representation of a cryptographic processing system capable of generating on the fly acceleration tables.

FIG. 1 shows a cryptographic processing system 20 that includes a user interface 22 and cryptographic processing circuitry 24 disposed in electrical communication with each other. In one arrangement, a connection 26 is a direct connection, such a wired or a wireless connection, that provides electrical communication between the user interface 22 and the cryptographic processing circuitry 24. In another arrangement, the connection 26 is the Internet or a local area network, providing electrical communication between the user interface 22 and the cryptographic processing circuitry 24.

The user interface 22, in one arrangement, is configured as a workstation having a monitor and a keyboard. In another arrangement, the user interface 22 could also be a keypad and LCD screen on a portable device such as a security token. The user interface 22 is configured to send an input value to be cryptographically processed 28 across the connection 26 to the cryptographic processing circuitry 24. The user interface 22 may obtain the input value to be cryptographically processed 28, for example, from an input from a user, from within the user interface 22 as an automatically generated value, or from some other external device. Examples of values to be cryptographically processed include: written text, numbers, or any other data that can be represented digitally.

The cryptographic processing circuitry 24 is configured to receive and apply ECC based cryptographic processing to the input value to be cryptographically processed 28 to calculate an ECC scalar multiplication result. To aid in the calculation of the ECC scalar multiplication result, the cryptographic processing circuitry 24 is configured to dynamically generate at least a portion of an acceleration table that can be stored in the cryptographic processing circuitry 24 and be used to accelerate ECC scalar multiplication result calculations. The cryptographic processing circuitry 24 is also configured to apply an ECC cryptographic processing algorithm to the calculated ECC scalar multiplication result to produce a cryptographically processed value 30. Examples of cryptographic processing algorithms that utilize ECC scalar multiplication include: Elliptic Curve Diffie-Hellman (ECDH), Elliptic Curve Digital Signature Algorithm (ECDSA), Dual Elliptic Curve Deterministic Random Bit Generator (ECDRBG), Elliptic Curve Integrated Encryption Scheme (ECIES), and elliptic curve key generation. The cryptographic processing circuitry 24 is additionally configured to output the cryptographically processed value 30 to the user interface 22.

In one arrangement, the cryptographic processing circuitry 24 stores a cryptographic processing application. The cryptographic processing application installs on the cryptographic processing circuitry 24 from a computer program product 32. In some arrangements, the computer program product 32 is stored on a computer readable medium such as magnetic media (diskettes, tapes, etc.), optical disk (CD-ROM, DVD, BLU-RAY, etc.) or electro-magnetic memory (ROM, RAM, etc.). In some arrangements, the computer program product 32 is stored on a computer readable medium that is available in a standard off-the-shelf form such as a shrink wrap package. When performed on a controller of the cryptographic processing circuitry 24, the cryptographic processing application causes the cryptographic processing circuitry 24 to conduct ECC based cryptographic processing on the input value to be cryptographically processed 28, accelerate the production of the ECC scalar multiplication result by dynamically generating at least a portion of an acceleration table, apply the ECC cryptographic processing algorithm to the ECC scalar multiplication result, and output the cryptographically processed value 30 to the user interface 22.

In use in one embodiment, the cryptographic processing circuitry 24 allows a user to create a public key for use in public key cryptography from an existing private key. For example, as will be described in detail below, the user interface 22 displays a graphical user interface (GUI) to a user. The user utilizes the GUI to input a private key (e.g., a randomly generated alphanumeric value). The user interface 22 forwards the private key over the connection 26 to the cryptographic processing circuitry 24. The cryptographic processing circuitry 24 conducts ECC based scalar multiplication on the private key to generate the ECC public key. If a desired pre-generated acceleration table is available in the cryptographic processing circuitry 24, then scalar multiplication is conducted as described after the below description of an alternative embodiment. Otherwise, the acceleration table must be generated dynamically as detailed further below.

In use in another embodiment, the cryptographic processing circuitry 24 allows a user to generate a cryptographically processed value using a previously generated public key with an ECC algorithm. For example, the user utilizes the user interface 22, in the form of a display and keypad of a security token, to input a user ID. The user interface 22 forwards the user ID over the connection 26 (which may be a signal trace within the security token) to the cryptographic processing circuitry 24 in the form of a security token controller. The security token controller conducts ECC based cryptographic processing on the user ID. If a desired pre-generated acceleration table is available in the cryptographic processing circuitry 24, then scalar multiplication is conducted as described below. Otherwise, the acceleration table must be generated dynamically as detailed further below.

To multiply a point P by a scalar k, the binary representation of k is split into w-bit parts, or windows. For every scalar k less than the order of the elliptic curve group, the required scalar multiple can be written as the following sum:

$$kP = a_s*(2^{w(s-1)})P + \ldots + a_3*(2^{2w})P + a_2*(2^w)P + a_1P \quad \text{Equation 1}$$

In this equation, ws is the bit length of the order of the group, and each of $a_1, \ldots, a_s$ range from 0 up to $(2^w-1)$. The value w is referred to as the window size. Each of $a_1, \ldots, a_s$ represent the value of a window of bits of the scalar k.

For example for a window size of 3 bits, the scalar product of 441 and P can be written:

$$441P = (2^6)*6P + (2^3)*7P + 1P \quad \text{Equation 2}$$
$$441P = 384P + 56P + 1P$$

The multiples 6P, 7P, 1P, can be determined from the windows of bits of the binary representation of 441 which is 110 111 001.

Suppose that all of the following multiples were pre-generated:

TABLE 1

| $(2^6) * 1P$ | $(2^3) * 1P$ | 1P |
| $(2^6) * 2P$ | $(2^3) * 2P$ | 2P |
| $(2^6) * 3P$ | $(2^3) * 3P$ | 3P |
| $(2^6) * 4P$ | $(2^3) * 4P$ | 4P |
| $(2^6) * 5P$ | $(2^3) * 5P$ | 5P |
| $(2^6) * 6P$ | $(2^3) * 6P$ | 6P |
| $(2^6) * 7P$ | $(2^3) * 7P$ | 7P |

To compute the scalar multiple kP for any scalar k of 9 bits simply requires (at most) the addition of one pre-generated point from each column. Note that it is not necessary to store a row for 0P, since the result is always zero. In general, for an elliptic curve group where the order of the group is ws bits for a window size of w, any scalar multiple kP can be computed with a maximum of (s−1) addition operations. This table of pre-computed multiples of a point is called an acceleration table. Each column of pre-generated values is referred to as a sub-table.

Alternatively, if a pre-generated acceleration table, such as the one shown above, is not available, the cryptographic processing circuitry 24 dynamically generates at least a portion of an acceleration table to be used in the acceleration of scalar multiplication of a point on a selected elliptic curve with a scalar. Upon using the dynamically generated acceleration table to produce the scalar multiplication result, the cryptographic processing circuitry 24 combines the scalar multiplication result with an ECC cryptographic processing algorithm to produce the cryptographically processed value 30. The cryptographic processing circuitry 24 outputs the cryptographically processed value 30 to the user interface where it may be obtained by the user.

Figure 2:
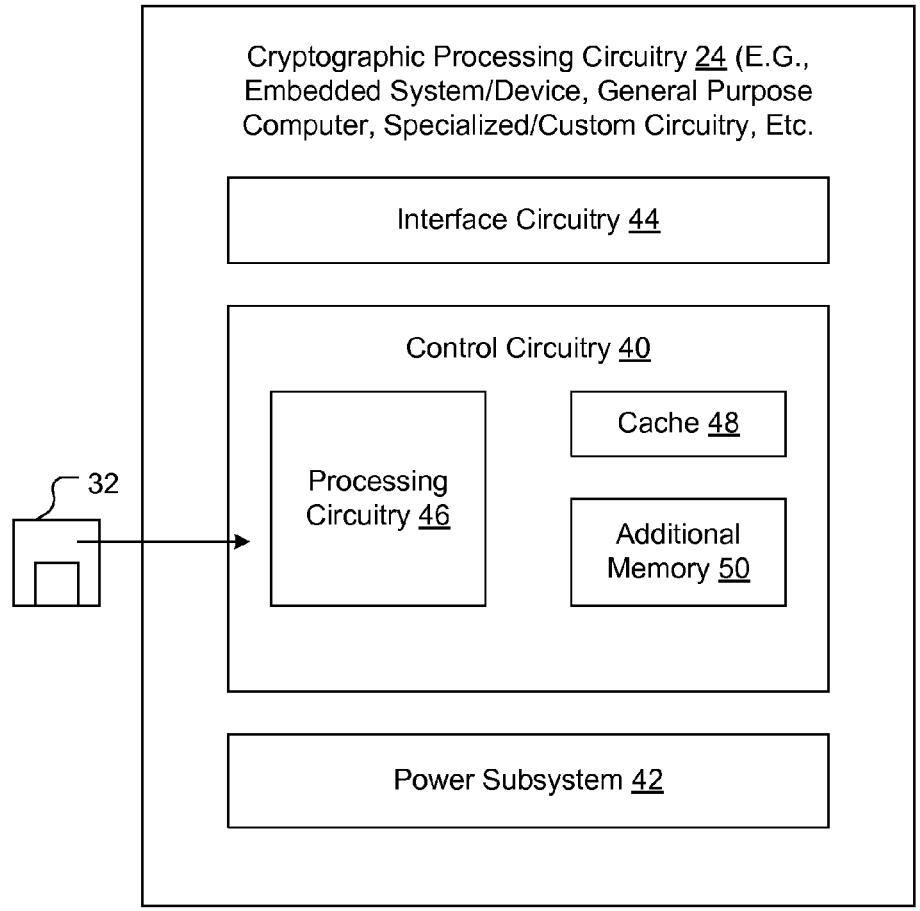
FIG. 2 illustrates a schematic representation of electronic circuitry that generates on the fly acceleration tables.

As indicated above, the cryptographic processing system 20 utilizes the cryptographic processing circuitry to conduct ECC scalar multiplication in an accelerated manner by dynamically generating an acceleration table in the absence of a pre-generated acceleration table. FIG. 2 shows the cryptographic processing circuitry 24 that includes control circuitry 40, a power subsystem 42, and interface circuitry 44. Examples of cryptographic processing circuitry 24 include embedded systems or devices, general purpose computers, and specialized or custom circuits, among others. The power subsystem 42 supplies power to the cryptographic processing circuitry 24 (e.g., grid power, battery power, solar power, combinations thereof, etc.). In one arrangement, the cryptographic processing circuitry 24 is the controller of a security token. The control circuitry 40 carries out significant operations relating to the techniques. The interface circuitry 44 enables information to be communicated electronically to and from the cryptographic processing circuitry 24 (e.g., over the user interface 22, signal lines, optical interfaces, pads/pins to an IC device, electronic displays/buttons, etc.).

The control circuitry 40 includes processing circuitry 46 (e.g., one or more microprocessors, FPGAs, ASICs, etc.), a high speed cache 48 (e.g., an L1 or L2 cache, quickly accessible semiconductor memory, etc.), and additional memory 50 (e.g., slower or more distant semiconductor memory, flash memory, magnetic memory, etc.). In some arrangements, the processing circuitry 46 resides in the core of a microprocessor device, and the high speed cache 48 resides in the cache of the microprocessor device. In such arrangements, software constructs (e.g., instructions, data structures, etc.) are frequently moved from the additional memory 50 into the cache 48 for quick access. Additionally, in such arrangements, the computer program product 32 is loaded onto the additional memory 50.

In use, the cryptographic processing circuitry 24 receives the input value to be cryptographically processed 28 at the interface circuitry 44. The interface circuitry forwards the input value to be cryptographically processed 28 to the control circuitry 40. In the control circuitry 40, the processing circuitry 46 retrieves instructions from the additional memory 50 to dynamically generate at least a portion of an acceleration table and place it in the high speed cache 48. The processing circuitry 46, utilizing the at least a portion of the acceleration table, calculates the scalar multiplication result. The processing circuitry then uses the scalar multiplication result with the ECC cryptographic processing algorithm to generate the cryptographically processed value 30. The control circuitry 40 forwards the cryptographically processed value 30 to the interface circuitry 44 which outputs the cryptographically processed value to the user interface 22. The control circuitry 40 may retain the dynamically generated portion of the acceleration table in the high speed cache for use in successive scalar multiplication calculations so that a new acceleration table need not be generated in those successive scalar multiplication calculations.

The technique by which the control circuitry 40 dynamically generates the at least a portion of the acceleration table can be maximized for speed. However, while higher generation speeds are desirable, the technique preferably ensures that the dynamically generated acceleration tables that are produced can still be able to offer valuable acceleration to scalar multiplication when compared to the unaccelerated method. Small acceleration tables that can entirely fit in the cache 48 operate faster than larger acceleration tables that do not entirely fit in the cache 48. To achieve these goals, a small and fast to generate acceleration table should be constructed, in which each sub-table only contains one point, and that point should be obtainable in as few operations as possible. To do this, the following acceleration table is used:

TABLE 2

| $(2^{ws})*1P$ | $(2^{w(s-1)})*1P$ | ... | $(2^{2w})*1P$ | $(2^{w})*1P$ | 1P |
|---|---|---|---|---|---|

The extra point $(2^{ws})*1P$ is only required if the bit length of the order of the elliptic curve group is divisible by the window size w. If it is not, then the most significant bit of the ws-bit scalar will always be zero, and a carry bit is not possible. Each point in the table can be obtained by doubling the previous point in the table w times. Acceleration tables which use one point per sub-table are not practical above five bits as the amount of processing required to create the multiples increases dramatically with window size. For this reason, only acceleration tables with window sizes between three and five are discussed below.

To maximize the speed at which the control circuitry 40 dynamically generates acceleration tables, an understanding of the relative speed of point arithmetic operations is important when considering algorithms to speed up ECC calculations. The table below shows the relative processing speed of point arithmetic operations for a P256 curve on a 3.3 GHz Intel Pentium computer using Java Development Kit 1.5 (JDK) as released by Sun Microsystems of Santa Clara, Calif. The relative processing speed is expected to be similar for other curves. The term Zero refers to the point at infinity (i.e. the additive identity).

TABLE 3

| Point Operation | Absolute Operations Per Second | Operations Per Second Relative to Add |
|---|---|---|
| Add | 6932 | 1 |
| Add to Zero | 714109 | 0.01 |
| Double | 8000 | 0.87 |
| Double Zero | 656043 | 0.01 |
| Negate | 345267 | 0.02 |

What the above table shows is that adding a point to a point which is zero, doubling a point which is zero, and negating a point are all relatively inexpensive operations relative to doubling and adding non-zero points. Doubling a point, however, is still less expensive than adding two points. For the dynamic generation of acceleration tables described below, only add and double operations are considered significant. The table below shows the operations involved in generating this acceleration table for various window sizes for a P256 curve and the amount of time it takes to generate this acceleration table relative to the add operation.

TABLE 4

| Window Size | Number of Doubles | Equivalent Number of Adds |
|---|---|---|
| 3 | 255 | 221.9 |
| 4 | 256 | 222.7 |
| 5 | 255 | 221.9 |

For dynamically generating an acceleration table with a window size of three bits, four running totals are utilized. The four running totals include RT1, RT2 (to be doubled), RT3 (to be tripled), and RT4 (to be quadrupled). The table below shows the mapping of values in the sub-table.

TABLE 5

| Multiple To Add | Method to Compute | Running Total | Carry |
|---|---|---|---|
| 1P | 1P | RT1 | 0 |
| 2P | 2 * 1P | RT2 | 0 |
| 3P | 3 * 1P | RT3 | 0 |
| 4P | 4 * 1P | RT4 | 0 |
| 5P | 8P − 3 * 1P | RT3 | 1 |
| 6P | 8P − 2 * 1P | RT2 | 1 |
| 7P | 8P − 1P | RT1 | 1 |

The final result of the scalar multiplication is maximized for speed by requiring only 2 doubles and 4 additions. Accordingly, the scalar multiplication result is obtained by accumulating the running totals as follows:

$$\text{Total}=RT1+RT3+\text{double}(RT2+RT3+\text{double}(RT4)) \quad \text{Equation 3}$$

The above described computation is now analyzed for speed. The field size of P256 is 256 bits. The window size is 3 bits. The number of sub-tables=256/3≈85.3, which, when rounding up is 86. The window size is three bits, so the probability that a window is zero is ⅛. Hence the probability that it is not zero is 7/8=0.875. Since 256 is not divisible by 3, there will be no final add required by a carry bit from the most significant bit window of the scalar. Given that the add for the first sub-table is free, there are 85 sub-tables, and the probability for any sub-table executing an add is 0.875, the average number of adds, due to adding up each sub-table is (86−1)*0.875. The number of adds and doubles required is =(2 doubles+4 adds)+((86−1)*0.875) adds=2 doubles+78.375 adds. Given that one double takes 0.87 as much time as an add, the speed of the algorithm associated with this table is equivalent to: speed=0.87*2+78.375 adds=80.115 adds.

The above described computation is now analyzed for size. The number of points that need to be in the 3 bit window size acceleration table is given by: size=the ceiling function of (order_bits/w)=the ceiling function of (256/3)=86 points.

For example, with a field size of 256 bits, the table below displays what the generated acceleration table for a window size of 3 bits would look like (note that an 87$^{th}$ window of $(2^{258})*1P$ is not necessary because the bit length of the order of the elliptic curve group, 256, is not divisible by the window size, 3):

TABLE 6

| $(2^{255})*1P$ | ... | $(2^{9})*1P$ | $(2^{6})*1P$ | $(2^{3})*1P$ | 1P |
|---|---|---|---|---|---|

For example, the use of the above acceleration table to assist the scalar multiplication for 921P is now shown. 921 written in binary (as a 256 bit representation with its digits grouped in threes to accommodate the 3 bit window size) is 001 110 011 001 (the additional 244 leading zeros are omitted for clarity).

Starting with the rightmost grouping, 001 in binary indicates 1 in base 10. Thus 1 is multiplied by the contents of the first window, 1P, to produce 1P which is added to RT1. There is no carry to the next window.

Progressing to the left, in the next grouping, 011 in binary indicates 3 in base 10. Thus 3 is multiplied by the contents of the second window, $2^3P$, to produce $3*(2^3P)$. So that all tripling is done at the same time, $(2^3P)$ is added to RT3. There is no carry to the next window.

Progressing to the left, in the next grouping, 110 in binary indicates 6 in base 10. Thus 6 is multiplied by the contents of the third window, $2^6P$, to produce $6*(2^6P)$. However the method to compute $6*(2^6P)$ is $8(2^6P)-2(2^6P)=(2^9P)-2(2^6P)$. So that all doubling is done at the same time, $-(2^6P)$ is added to RT2. 1 is carried to the next window, since $(2^9P)$ is in the next sub-table.

Finally in the leftmost grouping, 001 in binary indicates 1 in base 10. However since there is a carry of 1 from the previous window, 1+1=2 is multiplied by the contents of the fourth window, $2^9P$, to produce $2*(2^9P)$. So that all doubling is done at the same time, $(2^9P)$ is added to RT2. There is no carry to the next window.

The total sum of RT1=1P, the total sum of RT2=$-1(2^6P)+1(2^9P)$, the total sum of RT3=$1(2^3P)$, and the total sum of RT4=0. Accordingly, the scalar multiplication result is obtained by accumulating the running totals as follows: RT1+RT3+2 (RT2+RT3+2 (RT4)). Since 921P=1P+$1(2^3P)$+2 $((-1(2^6P)+1(2^9P))+1(2^3P)+2(0))$, it will be apparent that the values stored in RT1 through RT4 can be substituted to calculate 921P=RT1+RT3+2 (RT2+RT3+2 (RT4)) merely by summing, doubling, and negating the running total values.

For dynamically generating an acceleration table with a window size of four bits, eight running totals are utilized. The eight running totals include RT1, ..., RT8, where RTi is to be multiplied by i. The table below shows the mapping of values in the sub-table.

TABLE 7

| Multiple To Add | Method to Compute | Running Total | Carry |
|---|---|---|---|
| 1P | 1P | RT1 | 0 |
| 2P | 2 * 1P | RT2 | 0 |
| 3P | 3 * 1P | RT3 | 0 |
| 4P | 4 * 1P | RT4 | 0 |
| 5P | 5 * 1P | RT5 | 0 |
| 6P | 6 * 1P | RT6 | 0 |
| 7P | 7 * 1P | RT7 | 0 |
| 8P | 8 * 1P | RT8 | 0 |
| 9P | 16P − 7 * 1P | RT7 | 1 |
| 10P | 16P − 6 * 1P | RT6 | 1 |
| 11P | 16P − 5 * 1P | RT5 | 1 |
| 12P | 16P − 4 * 1P | RT4 | 1 |
| 13P | 16P − 3 * 1P | RT3 | 1 |
| 14P | 16P − 2 * P1 | RT2 | 1 |
| 15P | 16P − 1P | RT1 | 1 |

The final result of the scalar multiplication is maximized for speed by requiring approximately 3 doubles and 11 additions. Accordingly, the scalar multiplication result is obtained by accumulating the running totals as follows:

$$\text{Total} = RT1 + RT3 + RT5 - RT7 + \text{double}(RT2 + RT3 + RT6 + \text{double}(RT4 + RT5 + RT6 + \text{double}(RT8 + RT7)))$$

Equation 4

An alternative computation that does not require any subtractions and also requires approximately 11 additions and 3 doubles is as follows:
First compute:

$$RTtemp=RT6+RT7$$

Equation 5

Then compute:

$$\text{Total} = RT1 + RT3 + RT5 + RT7 + \text{double}(RT2 + RT3 + RTtemp + \text{double}(RT4 + RT5 + RTtemp + \text{double}(RT8)))$$

Equation 6

The above described computation is now analyzed for speed. The field size of P256 is 256 bits. The window size is 4 bits. The number of sub-tables=256/4=64. The window size is four bits, so the probability that a window is zero is 1/16. Hence the probability that it is not zero is 15/16≈0.94. Given that the add for the first sub-table is free, there are 64 sub-tables, and the probability for any sub-table executing an add is 0.94, the average number of adds due to adding up each sub-table is (64−1)*0.94. Seven of the values in each sub-table are obtained using subtraction, which requires a carry. Hence, the probability of needing to do a final add (using a $65^{th}$ sub-table) is 7/16≈0.44. The number of adds and doubles required to sum the running totals is: (3 doubles+11 adds)+ ((64−1)*0.94+0.44) adds=3 doubles+70.66 adds. Given that one double takes 0.87 as much time as an add, the speed of the algorithm associated with this table is equivalent to: speed=0.87*3+70.66 adds=73.27 adds.

The above described computation is now analyzed for size. The number of points that needs to be in the 4 bit window size acceleration table is given by: the ceiling function of (order_bits/w)+1 points=the ceiling function of (256/4)+1 points=65 points. Note that 1 point is added because 256 is evenly divisible by 4.

For dynamically generating an acceleration table with a window size of five bits, sixteen running totals are utilized. The sixteen running totals include RT1, R2, ..., RT16, where RTi is to be multiplied by i. The table below shows the mapping of values in the sub-table.

TABLE 8

| Multiple To Add | Method to Compute | Running Total | Carry |
|---|---|---|---|
| 1P | 1P | RT1 | 0 |
| 2P | 2 * 1P | RT2 | 0 |
| 3P | 3 * 1P | RT3 | 0 |
| ... | ... | ... | ... |
| 16P | 16 * 1P | RT16 | 0 |
| 17P | 32P − 15 * 1P | RT15 | 1 |
| 18P | 32P − 14 * 1P | RT14 | 1 |
| ... | ... | ... | ... |
| 30P | 32P − 2 * 1P | RT2 | 1 |
| 31P | 32P − 1P | RT1 | 1 |

The final result of the scalar multiplication is maximized for speed by requiring approximately 4 doubles and 26 additions. Accordingly, the scalar multiplication result is obtained by accumulating the running totals as follows:
First compute:

$$RTtemp = RT9 + RT11 + RT13 \quad \text{Equation 7}$$

Then compute:

$$\begin{aligned}Total =\ & RT1 + RT3 + RT5 - RT7 + RTtemp - RT15 + \\ & \text{double}(RT2 + RT3 + RT6 + RT10 + RT11 - RT14 + \\ & \text{double}(RT4 + RT5 + RT6 + RT12 + RT13 + \\ & \text{double}(RT7 + RT8 + RTtemp + RT10 + \\ & RT12 + \text{double}(RT14 + RT15 + RT16))))\end{aligned} \quad \text{Equation 8}$$

The above described computation is now analyzed for speed. The field size of P256 is 256 bits. The window size is 5 bits. The number of sub-tables=256/5=51.2, which when rounding up is 52. The window size is five bits, so the probability that a window is zero is 1/32. Hence the probability that it is not zero is 31/32≈0.97. Given that the add for the first sub-table is free, there are 52 sub-tables, and the probability for any sub-table executing an add is 0.97, the average number of adds due to adding up each sub-table is (52−1)*0.97. Since 256 is not divisible by 5, there will be no final add required by a carry bit from the most significant bit window of the scalar. The number of adds and doubles required is: =(4 doubles+26 adds)+((52−1)*0.97) adds=4 doubles+75.47 adds=78.95 adds.

The above described computation is now analyzed for size. The number of points that needs to be in the five bit window size acceleration table is given by: size=the ceiling function of (order_bits/w)=the ceiling function of (260/5)=52 points.

The table below compares the speed and size of all three dynamically generated acceleration tables described above, a commonly used pre-generated acceleration table, and the non-accelerated scalar multiplication case. The amount of time relative an add operation is also provided for all three dynamically generated acceleration tables. Since each entry in the sub-table is produced by doubling the previous entry w times, the time to generate is calculated by subtracting 1 from the point size (the first sub-table is free since adding a point to zero takes an insignificant amount of time when compared to the time to do an add operation), multiplying that value by the window size, and multiplying that value by 0.87 (ratio of the speed of a double to the speed of an add operation).

TABLE 9

| Acceleration Table Type | Size in Points | Speed in Adds | Time to Generate for P256 in Adds |
|---|---|---|---|
| No acceleration table | 0 | 350.7 | — |
| P256 acceleration table using 2 running totals and a 5 bit Window Size | 572 | 51.34 | — |
| Fast Generate 3 bit Window Size | 86 | 80.12 | 221.9 |
| Fast Generate 4 bit Window Size | 65 | 73.27 | 222.7 |
| Fast Generate 5 bit Window Size | 52 | 78.95 | 221.9 |

From the table it can be seen that: It is quicker to generate 3, 4, or 5 bit Window Size tables and then use the table than to do a non-accelerated scalar multiplication. Once a 4-bit Window Size table is generated it should be able to be used to do scalar multiplication at 70% of the speed of the commonly used pre-generated P256 acceleration table and 479% of the speed of an un-accelerated scalar multiply.

Figure 3:
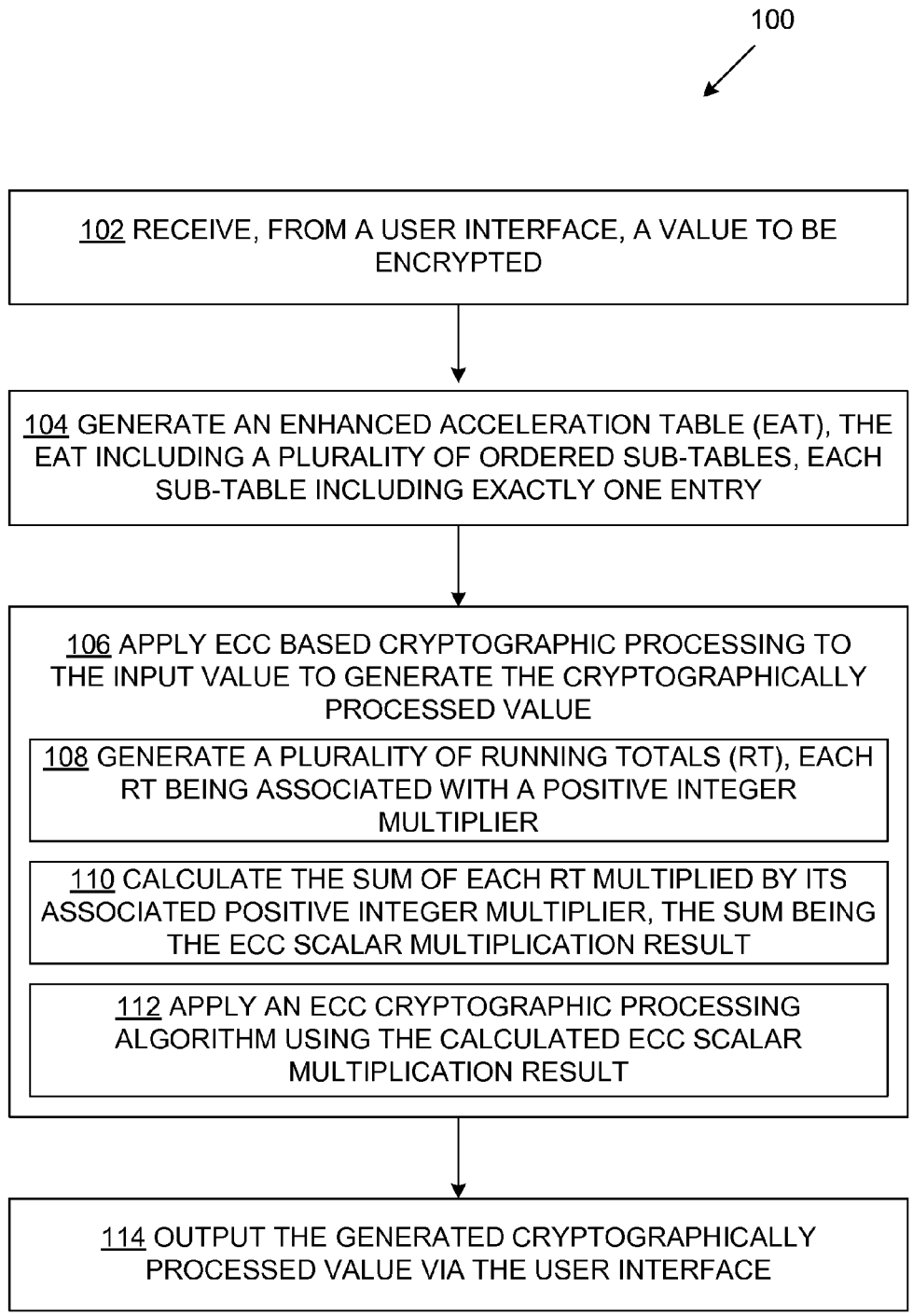
FIG. 3 is a flowchart that illustrates a procedure for generating an enhanced acceleration table.

FIG. 3 is a flowchart that illustrates an example procedure 100 performed by the cryptographic processing circuitry 24 that generates the cryptographically processed value 30 from the input value to be cryptographically processed 28 using ECC scalar multiplication that is accelerated by a dynamically generated acceleration table.

In step 102, the cryptographic processing circuitry 24 receives, from a user interface 22, an input value to be cryptographically processed 28. In one embodiment, a private key is received by the cryptographic processing circuitry 24.

In step 104, the cryptographic processing circuitry 24 generates an enhanced acceleration table (EAT), the EAT including a plurality of ordered sub-tables, each sub-table including exactly one entry. In one embodiment, the EAT has a window size of 4 bits and is generated on the fly (i.e., as a direct result of the cryptographic processing circuitry receiving the input value to be cryptographically processed 28). The entry in each sub-table is generated by doubling the previous entry 4 (i.e., w) times.

In step 106, the cryptographic processing circuitry 24 performs ECC scalar multiplication with the generated EAT.

In step 108, the cryptographic processing circuitry 24 performs ECC scalar multiplication with the generated EAT by generate a plurality of running totals, each running total being associated with a positive integer multiplier.

In step 110, the cryptographic processing circuitry 24 performs ECC scalar multiplication with the generated EAT by calculating the sum of each running total multiplied by its associated positive integer multiplier, the sum being the ECC scalar multiplication result.

In step 112, the cryptographic processing circuitry 24 applies an ECC cryptographic processing algorithm using the calculated ECC scalar multiplication result. In one embodiment examples of such an ECC cryptographic processing algorithms include: ECDH, ECDSA, ECDRBG, ECIES, and elliptic curve key generation.

In step 114, the cryptographic processing circuitry 24 outputs the generated cryptographically processed value via the user interface 22.

While various embodiments of the invention have been particularly shown and described, it will be understood by those skilled in the art that various changes in form and details may be made therein without departing from the spirit and scope of the invention as defined by the appended claims.

For example, while the dynamic generation of at least a portion of an acceleration table for use in elliptic curve cryptography has been described as being used in conjunction with creating and using public or private keys, it is not limited to this use and may be used in any situation where ECC is performed such as, for example, asymmetric encryption, key agreement, pseudo random number generation or digital signatures.

Additionally, the double operation was described as being approximately 0.87 times as fast as an add operation. Experimental values for this speed may vary depending on the system used and may be, for example, approximately 0.73 times as fast as an add operation.

What is claimed is:

1. A method for generating a cryptographically processed value comprising:
   receiving, in cryptographic processing circuitry from a user interface, an input value to be cryptographically processed;
   applying, in the cryptographic processing circuitry, elliptic curve cryptography (ECC) based cryptographic processing to the input value to generate the cryptographically processed value, wherein applying ECC-based cryptographic processing includes:
generating an enhanced acceleration table (EAT) in response to receiving, in the cryptographic processing circuitry from the user interface, an input value to be cryptographically processed, the EAT including a plurality of ordered sub-tables, each sub-table including exactly one entry,
performing ECC scalar multiplication with the generated EAT, wherein performing ECC scalar multiplication with the EAT includes (i) calculating an ECC scalar multiplication result by generating a plurality of running totals, each running total being associated with a positive integer multiplier and (ii) calculating the sum of each running total multiplied by its associated positive integer multiplier, the sum being the ECC scalar multiplication result,
wherein generating the plurality of running totals includes, for each sub-table of the plurality of ordered sub-tables, (i) adding a value associated with the one entry in that sub-table to a running total associated with a multiplier of the plurality of multipliers, the value being one of the one entry in that sub-table and a negation of the one entry in that sub-table and (ii) carrying a value of 1 to a next sub-table if the value is the negation of the one entry in the current sub-table, and
applying an ECC cryptographic processing algorithm using the calculated ECC scalar multiplication result; and
outputting, from the cryptographic processing circuitry, the generated cryptographically processed value via the user interface;
wherein performing ECC scalar multiplication includes calculating a product of a scalar value and a given point on an elliptic curve, the given point being represented by an ordered pair of coordinate values, a bit-length of each coordinate value of the pair of coordinate values being equal to a field size of an elliptic curve group based on the given point and the elliptic curve, the scalar value also having the same bit-length;
wherein the number of sub-tables in the EAT is defined by the bit-length divided by a window-size;
wherein a binary representation of the scalar value is divided into an ordered set of subsets, each subset being a binary value having a length equal to the window-size, each subset corresponding to a particular sub-table in order;
wherein generating the plurality of running totals further includes selecting the positive integer multiplier based on the binary value of the subset associated with that sub-table;
wherein generating the plurality of running totals includes generating an amount of running totals equal to two (2) raised to the power of (^) the window size minus one (w−1), each running total (RT1, . . . , and RTi, wherein i=2^(w−1)), being exclusively associated with one value chosen from the set {1, . . . , i} as its associated positive integer multiplier; and
wherein calculating the sum of each running total multiplied by its associated positive integer multiplier consists of performing a series of nested add, double, and negation operations on the running totals.

2. A method as in claim 1:
wherein the field size is 256;
wherein the elliptic curve group is the NIST standard P256 elliptic curve group; and
wherein the window-size is a value chosen from the set {3, 4, 5}.

3. A method as in claim 1:
wherein the window-size is 3 bits;
wherein generating the amount of running totals equal to two (2) raised to the power of (^) the window size minus one (w−1) includes generating exactly four (4) running totals (RT1, RT2, RT3, and RT4), the exactly four (4) running totals each being exclusively associated with one value chosen from the set {1, 2, 3, 4} as its associated positive integer multiplier;
wherein performing the series of nested add, double, and negation operations on the running totals includes:
doubling RT4 to form a first intermediate value,
calculating a sum of RT2, RT3, and the first intermediate value to form a second intermediate value,
doubling the second intermediate value to form a third intermediate value, and
calculating a sum of RT1, RT3, and the third intermediate value to form the ECC scalar multiplication result.

4. A method as in claim 1:
wherein the window-size is 4 bits;
wherein generating the amount of running totals equal to two (2) raised to the power of (^) the window size minus one (w−1) includes generating exactly eight (8) running totals (RT1, RT2, RT3, RT4, RT5, RT6, RT7, and RT8), the exactly eight (8) running totals each being exclusively associated with a value chosen from the set {1, 2, 3, 4, 5, 6, 7, 8} as its associated positive integer multiplier;
wherein performing the series of nested add, double, and negation operations on the running totals includes:
calculating a sum of RT8 and RT7 to form a first intermediate value,
doubling the first intermediate value to form a second intermediate value,
calculating a sum of RT4, RT5, RT6, and the second intermediate value to form a third intermediate value,
doubling the third intermediate value to form a fourth intermediate value,
calculating a sum of RT2, RT3, RT6, and the fourth intermediate value to form a fifth intermediate value,
doubling fifth intermediate value to form a sixth intermediate value,
negating RT7 to form a seventh intermediate value, and
calculating a sum of RT1, RT3, RT5, the sixth intermediate value, and the seventh intermediate value to form the ECC scalar multiplication result.

5. A method as in claim 1:
wherein the window-size is 5 bits;
wherein generating the amount of running totals equal to two (2) raised to the power of (^) the window size minus one (w−1) includes generating exactly sixteen (16) running totals (RT1, RT2, RT3, RT4, RT5, RT6, RT7, RT8, RT9, RT10, RT12, RT13, RT14, RT15, and RT16), the exactly sixteen (16) running totals each being exclusively associated with a value chosen from the set {1, 2, 3, 4, 5, 6, 7, 8, 9, 10, 11, 12, 13, 14, 15, 16} as its associated positive integer multiplier;
wherein performing the series of nested add, double, and negation operations on the running totals includes:
calculating a sum of RT9, RT11 and RT13 to form a first intermediate value,
calculating a sum of RT14, RT15, and RT16 to form a second intermediate value,
doubling the second intermediate value to form a third intermediate value, calculating a sum of RT7, RT8, the first intermediate value, RT10, RT12, and the third intermediate value to form a fourth intermediate value, doubling the fourth intermediate value to form a fifth intermediate value, calculating a sum of RT4, RT5, RT6, RT12, RT13, and the fifth intermediate value to form a sixth intermediate value, doubling the sixth intermediate value to form a seventh intermediate value, negating RT14 to form a eighth intermediate value, calculating a sum of RT2, RT3, RT6, RT10, RT11, the seventh intermediate value, and the eighth intermediate value to form a ninth intermediate value, doubling the ninth intermediate value to form a tenth intermediate value, negating RT7 to form a eleventh intermediate value, negating RT15 to form a twelfth intermediate value, and calculating a sum of RT1, RT3, RT5, the first intermediate value, the tenth intermediate value, the eleventh intermediate value, and the twelfth intermediate value to form the ECC scalar multiplication result.

6. A method for generating a cryptographically processed value comprising:

receiving, in cryptographic processing circuitry from a user interface, an input value to be cryptographically processed;

applying, in the cryptographic processing circuitry, elliptic curve cryptography (ECC) based cryptographic processing to the input value to generate the cryptographically processed value, wherein applying ECC-based cryptographic processing includes:

generating an enhanced acceleration table (EAT) in response to receiving, in the cryptographic processing circuitry from the user interface, an input value to be cryptographically processed, the EAT including a plurality of ordered sub-tables, each sub-table including exactly one entry, performing ECC scalar multiplication with the generated EAT, wherein performing ECC scalar multiplication with the EAT includes (i) calculating an ECC scalar multiplication result by generating a plurality of running totals, each running total being associated with a positive integer multiplier and (ii) calculating the sum of each running total multiplied by its associated positive integer multiplier, the sum being the ECC scalar multiplication result, wherein generating the plurality of running totals includes, for each sub-table of the plurality of ordered sub-tables, (i) adding a value associated with the one entry in that sub-table to a running total associated with a multiplier of the plurality of multipliers, the value being one of the one entry in that sub-table and a negation of the one entry in that sub-table and (ii) carrying a value of 1 to a next sub-table if the value is the negation of the one entry in the current sub-table, and applying an ECC cryptographic processing algorithm using the calculated ECC scalar multiplication result; and outputting, from the cryptographic processing circuitry, the generated cryptographically processed value via the user interface;

wherein the input value to be cryptographically processed is a first input value to be cryptographically processed;

wherein the ECC scalar multiplication result is a first ECC scalar multiplication;

wherein the cryptographically processed value is a first cryptographically processed value; and wherein the method further comprises:

storing the EAT in a cache, receiving, in the cryptographic processing circuitry from the user interface, a second input value to be cryptographically processed, applying, in the cryptographic processing circuitry, ECC based cryptographic processing to the second input value to generate a second cryptographically processed value by: (i) performing ECC scalar multiplication with the stored EAT to calculate a second ECC scalar multiplication result, and (ii) applying the ECC cryptographic processing algorithm using the calculated second ECC scalar multiplication result, and outputting, from the cryptographic processing circuitry, the generated second cryptographically processed value via the user interface.

7. A computer program product comprising a non-transitory computer-readable medium including computer program logic encoded thereon, which, when performed on a computer directs the computer to perform the following operations:

receiving, from a user interface, an input value to be cryptographically processed;

applying elliptic curve cryptography (ECC) based cryptographic processing to the input value to generate an cryptographically processed value, wherein applying ECC-based cryptographic processing includes:

generating an enhanced acceleration table (EAT) in response to receiving, from the user interface, an input value to be cryptographically processed, the EAT including a plurality of ordered sub-tables, each sub-table including exactly one entry, and performing ECC scalar multiplication with the generated EAT, wherein performing ECC scalar multiplication with the EAT includes (i) calculating an ECC scalar multiplication result by generating a plurality of running totals, each running total being associated with a positive integer multiplier and (ii) calculating the sum of each running total multiplied by its associated positive integer multiplier, the sum being the ECC scalar multiplication result, wherein generating the plurality of running totals includes, for each sub-table of the plurality of ordered sub-tables, (i) adding a value associated with the one entry in that sub-table to a running total associated with a multiplier of the plurality of multipliers, the value being one of the one entry in that sub-table and a negation of the one entry in that sub-table and (ii) carrying a value of 1 to a next sub-table if the value is the negation of the one entry in the current sub-table, and applying an ECC cryptographic processing algorithm using the calculated ECC scalar multiplication result; and outputting the generated cryptographically processed value via the user interface;

wherein performing ECC scalar multiplication includes calculating a product of a scalar value and a given point on an elliptic curve, the given point being represented by an ordered pair of coordinate values, a bit-length of each coordinate value of the pair of coordinate values being equal to a field size of an elliptic curve group based on the given point and the elliptic curve, the scalar value also having the same bit-length;

wherein the number of sub-tables in the EAT is defined by the bit-length divided by a window-size;

wherein a binary representation of the scalar value is divided into an ordered set of subsets, each subset being a binary value having a length equal to the window-size, each subset corresponding to a particular sub-table in order;

wherein generating the plurality of running totals further includes selecting the positive integer multiplier based on the binary value of the subset associated with that sub-table;

wherein generating the plurality of running totals includes generating an amount of running totals equal to two (2) raised to the power of (^) the window size minus one (w−1), each running total (RT1, . . . , and RTi, wherein i=2^(w−1)), being exclusively associated with one value chosen from the set {1, . . . , i} as its associated positive integer multiplier; and wherein calculating the sum of each running total multiplied by its associated positive integer multiplier consists of performing a series of nested add, double, and negation operations on the running totals.

8. A computer program product as in claim 7:

wherein the field size is 256;

wherein the elliptic curve group is the NIST standard P256 elliptic curve group; and wherein the window-size is a value chosen from the set {3, 4, 5} as its associated positive integer multiplier.

9. A computer program product as in claim 7:

wherein the window-size is 3 bits;

wherein generating the amount of running totals equal to two (2) raised to the power of (^) the window size minus one (w−1) includes generating exactly four (4) running totals (RT1, RT2, RT3, and RT4), the exactly four (4) running totals each being exclusively associated with one value chosen from the set {1, 2, 3, 4} as its associated positive integer multiplier;

wherein performing the series of nested add, double, and negation operations on the running totals includes:
doubling RT4 to form a first intermediate value,
calculating a sum of RT2, RT3, and the first intermediate value to form a second intermediate value,
doubling the second intermediate value to form a third intermediate value, and
calculating a sum of RT1, RT3, and the third intermediate value to form the ECC scalar multiplication result.

10. A computer program product as in claim 7:

wherein the window-size is 4 bits;

wherein generating the amount of running totals equal to two (2) raised to the power of (^) the window size minus one (w−1) includes generating exactly eight (8) running totals (RT1, RT2, RT3, RT4, RT5, RT6, RT7, and RT8), the exactly eight (8) running totals each being exclusively associated with a value chosen from the set {1, 2, 3, 4, 5, 6, 7, 8} as its associated positive integer multiplier;

wherein performing the series of nested add, double, and negation operations on the running totals includes:
calculating a sum of RT8 and RT7 to form a first intermediate value,
doubling the first intermediate value to form a second intermediate value,
calculating a sum of RT4, RT5, RT6, and the second intermediate value to form a third intermediate value,
doubling the third intermediate value to form a fourth intermediate value,
calculating a sum of RT2, RT3, RT6, and the fourth intermediate value to form a fifth intermediate value,
doubling fifth intermediate value to form a sixth intermediate value,
negating RT7 to form a seventh intermediate value, and
calculating a sum of RT1, RT3, RT5, the sixth intermediate value, and the seventh intermediate value to form the ECC scalar multiplication result.

11. A computer program product as in claim 7:

wherein the window-size is 5 bits;

wherein generating the amount of running totals equal to two (2) raised to the power of (^) the window size minus one (w−1) includes generating exactly sixteen (16) running totals (RT1, RT2, RT3, RT4, RT5, RT6, RT7, RT8, RT9, RT10, RT12, RT13, RT14, RT15, and RT16), the exactly sixteen (16) running totals each being exclusively associated with a value chosen from the set {1, 2, 3, 4, 5, 6, 7, 8, 9, 10, 11, 12, 13, 14, 15, 16} as its associated positive integer multiplier;

wherein performing the series of nested add, double, and negation operations on the running totals includes:
calculating a sum of RT9, RT11 and RT13 to form a first intermediate value,
calculating a sum of RT14, RT15, and RT16 to form a second intermediate value,
doubling the second intermediate value to form a third intermediate value,
calculating a sum of RT7, RT8, the first intermediate value, RT10, RT12, and the third intermediate value to form a fourth intermediate value,
doubling the fourth intermediate value to form a fifth intermediate value,
calculating a sum of RT4, RT5, RT6, RT12, RT13, and the fifth intermediate value to form a sixth intermediate value,
doubling the sixth intermediate value to form a seventh intermediate value,
negating RT14 to form a eighth intermediate value,
calculating a sum of RT2, RT3, RT6, RT10, RT11, the seventh intermediate value, and the eighth intermediate value to form a ninth intermediate value,
doubling the ninth intermediate value to form a tenth intermediate value,
negating RT7 to form a eleventh intermediate value,
negating RT15 to form a twelfth intermediate value,
calculating a sum of RT1, RT3, RT5, the first intermediate value, the tenth intermediate value, the eleventh intermediate value, and the twelfth intermediate value to form the ECC scalar multiplication result.

12. A computer program product as in claim 7:

wherein the input value to be cryptographically processed is a first input value to be cryptographically processed;

wherein the ECC scalar multiplication result is a first ECC scalar multiplication;

wherein the cryptographically processed value is a first cryptographically processed value; and wherein the computer-readable medium includes computer program logic encoded thereon, which, when performed on a computer directs the computer to further perform the following operations:
storing the EAT in a cache,
receiving, from the user interface, a second input value to be cryptographically processed,
applying ECC based cryptographic processing to the second input value to generate a second cryptographically processed value by: (i) performing ECC scalar multiplication with the stored EAT to calculate a second ECC scalar multiplication result, and (ii) applying the ECC cryptographic processing algorithm using the calculated second ECC scalar multiplication result, and outputting the generated second cryptographically processed value via the user interface.

13. A cryptographic processing apparatus comprising:

a user interface; and cryptographic processing circuitry in electrical communication with the user interface, the cryptographic processing circuitry being configured to:

receive, from the user interface, an input value to be cryptographically processed;

apply elliptic curve cryptography (ECC) based cryptographic processing to the input value to generate an cryptographically processed value, wherein being configured to apply ECC-based cryptographic processing includes being configured to:

generate an enhanced acceleration table (EAT) in response to receiving, from the user interface, an input value to be cryptographically processed, the EAT including a plurality of ordered sub-tables, each sub-table including exactly one entry, perform ECC scalar multiplication with the generated EAT, wherein being configured to perform ECC scalar multiplication with the EAT includes being configured to (i) calculate an ECC scalar multiplication result by generating a plurality of running totals, each running total being associated with a positive integer multiplier and (ii) calculate the sum of each running total multiplied by its associated positive integer multiplier, the sum being the ECC scalar multiplication result, wherein being configured to generate the plurality of running totals includes being configured to, for each sub-table of the plurality of ordered sub-tables, (i) add a value associated with the one entry in that sub-table to a running total associated with a multiplier of the plurality of multipliers, the value being one of the one entry in that sub-table and a negation of the one entry in that sub-table and (ii) carry a value of 1 to a next sub-table if the value is the negation of the one entry in the current sub-table, and apply an ECC cryptographic processing algorithm using the calculated ECC scalar multiplication result; and output the generated cryptographically processed value via the user interface;

wherein being configured to perform ECC scalar multiplication includes being configured to calculate a product of a scalar value and a given point on an elliptic curve, the given point being represented by an ordered pair of coordinate values, a bit-length of each coordinate value of the pair of coordinate values being equal to a field size of an elliptic curve group based on the given point and the elliptic curve, the scalar value also having the same bit-length;

wherein the number of sub-tables in the EAT is defined by the bit-length divided by a window-size;

wherein a binary representation of the scalar value is divided into an ordered set of subsets, each subset being a binary value having a length equal to the window-size, each subset corresponding to a particular sub-table in order;

wherein being configured to generate the plurality of running totals further includes being configured to select the positive integer multiplier based on the binary value of the subset associated with that sub-table;

wherein being configured to generate the plurality of running totals includes being configured to generate an amount of running totals equal to two (2) raised to the power of (^) the window size minus one (w−1), each running total (RT1, . . . , and RTi, wherein i=2^(w−1)), being exclusively associated with one value chosen from the set {1, . . . , i} as its associated positive integer multiplier; and wherein being configured to calculate the sum of each running total multiplied by its associated positive integer multiplier consists of being configured to perform a series of nested add, double, and negation operations on the running totals.

14. A cryptographic processing apparatus as in claim 13:

wherein the field size is 256;

wherein the elliptic curve group is the NIST standard P256 elliptic curve group; and wherein the window-size is a value chosen from the set {3, 4, 5}.

15. A cryptographic processing apparatus as in claim 13:

wherein the window-size is 3 bits;

wherein being configured to generate the amount of running totals equal to two (2) raised to the power of (^) the window size minus one (w−1) includes being configured to generate exactly four (4) running totals (RT1, RT2, RT3, and RT4), the exactly four (4) running totals each being exclusively associated with one value chosen from the set {1, 2, 3, 4} as its associated positive integer multiplier;

wherein being configured to perform the series of nested add, double, and negation operations on the running totals includes being configured to:

double RT4 to form a first intermediate value, calculate a sum of RT2, RT3, and the first intermediate value to form a second intermediate value, double the second intermediate value to form a third intermediate value, and calculate a sum of RT1, RT3, and the third intermediate value to form the ECC scalar multiplication result.

16. A cryptographic processing apparatus as in claim 13:

wherein the window-size is 4 bits;

wherein being configured to generate the amount of running totals equal to two (2) raised to the power of (^) the window size minus one (w−1) includes being configured to generate exactly eight (8) running totals (RT1, RT2, RT3, RT4, RT5, RT6, RT7, and RT8), the exactly eight (8) running totals each being exclusively associated with a value chosen from the set {1, 2, 3, 4, 5, 6, 7, 8} as its associated positive integer multiplier;

wherein being configured to perform the series of nested add, double, and negation operations on the running totals includes being configured to:

calculate a sum of RT8 and RT7 to form a first intermediate value, double the first intermediate value to form a second intermediate value, calculate a sum of RT4, RT5, RT6, and the second intermediate value to form a third intermediate value, double the third intermediate value to form a fourth intermediate value, calculate a sum of RT2, RT3, RT6, and the fourth intermediate value to form a fifth intermediate value, double fifth intermediate value to form a sixth intermediate value, negate RT7 to form a seventh intermediate value, and
calculate a sum of RT1, RT3, RT5, the sixth intermediate value, and the seventh intermediate value to form the ECC scalar multiplication result.

17. A cryptographic processing apparatus as in claim 13:
wherein the window-size is 5 bits;
wherein being configured to generate the amount of running totals equal to two (2) raised to the power of (^) the window size minus one (w−1) includes being configured to generate exactly sixteen (16) running totals (RT1, RT2, RT3, RT4, RT5, RT6, RT7, RT8, RT9, RT10, RT12, RT13, RT14, RT15, and RT16), the exactly sixteen (16) running totals each being exclusively associated with a value chosen from the set {1, 2, 3, 4, 5, 6, 7, 8, 9, 10, 11, 12, 13, 14, 15, 16} as its associated positive integer multiplier;
wherein being configured to perform the series of nested add, double, and negation operations on the running totals includes being configured to:
calculate a sum of RT9, RT11 and RT13 to form a first intermediate value,
calculate a sum of RT14, RT15, and RT16 to form a second intermediate value,
double the second intermediate value to form a third intermediate value,
calculate a sum of RT7, RT8, the first intermediate value, RT10, RT12, and the third intermediate value to form a fourth intermediate value,
double the fourth intermediate value to form a fifth intermediate value,
calculate a sum of RT4, RT5, RT6, RT12, RT13, and the fifth intermediate value to form a sixth intermediate value,
double the sixth intermediate value to form a seventh intermediate value,
negate RT14 to form a eighth intermediate value,
calculate a sum of RT2, RT3, RT6, RT10, RT11, the seventh intermediate value, and the eighth intermediate value to form a ninth intermediate value,
double the ninth intermediate value to form a tenth intermediate value,
negate RT7 to form a eleventh intermediate value,
negate RT15 to form a twelfth intermediate value,
calculate a sum of RT1, RT3, RT5, the first intermediate value, the tenth intermediate value, the eleventh intermediate value, and the twelfth intermediate value to form the ECC scalar multiplication result.

18. A cryptographic processing apparatus as in claim 13:
wherein the input value to be cryptographically processed is a first input value to be cryptographically processed;
wherein the ECC scalar multiplication result is a first ECC scalar multiplication;
wherein the cryptographically processed value is a first cryptographically processed value; and
wherein the cryptographic processing circuitry is further configured to:
store the EAT in a cache,
receive, from a user interface, a second input value to be cryptographically processed,
apply ECC based cryptographic processing to the second input value to generate a second cryptographically processed value by being configured to: (i) perform ECC scalar multiplication with the stored EAT to calculate a second ECC scalar multiplication result, and (ii) apply the ECC cryptographic processing algorithm using the calculated second ECC scalar multiplication result, and
output the generated second cryptographically processed value via the user interface.

\* \* \* \* \*